United States Patent
Colombo

(10) Patent No.: US 7,363,204 B2
(45) Date of Patent: Apr. 22, 2008

(54) PROCESS FOR DEVELOPING AN AGENT-BASED CONTROL SYSTEM FOR AN INDUSTRIAL FLEXIBLE PRODUCTION SYSTEM

(75) Inventor: Armando Walter Colombo, Karlstein (DE)

(73) Assignee: Schneider Electric GmbH, Seligenstadt (DE)

( * ) Notice: Subject to any disclaimer, the term of this patent is extended or adjusted under 35 U.S.C. 154(b) by 649 days.

(21) Appl. No.: 10/446,151

(22) Filed: May 28, 2003

(65) Prior Publication Data
US 2004/0111700 A1    Jun. 10, 2004

(30) Foreign Application Priority Data
Jun. 3, 2002  (DE) ................. 102 24 650

(51) Int. Cl.
G06G 7/48 (2006.01)
G06F 7/60 (2006.01)
G05B 15/00 (2006.01)
G05B 13/02 (2006.01)

(52) U.S. Cl. .............. 703/7; 703/2; 703/6; 700/1; 700/51

(58) Field of Classification Search .......... 703/2, 703/7, 6; 700/1, 51
See application file for complete search history.

(56) References Cited

U.S. PATENT DOCUMENTS 7,174,284 B2 * 2/2007 Dolansky et al. .......... 703/2

FOREIGN PATENT DOCUMENTS

| DE | 198 31 651 | 1/2000 |
|---|---|---|
| DE | 100 36 712 | 2/2002 |
| WO | 01/22271 | 3/2001 |

OTHER PUBLICATIONS

Hammami, S. et al. "Designing Control and Diagnosis for Flexible Manufacturing Systems as a Multi-Agent System Using Blackboard and Object Petri Nets." 1995 INRIA/IEEE Symposium on Emerging Technologies and Factory Automation. Oct. 10-13, 1995. vol. 1, pp. 373-382.*

Colombo, A.W. et al. "Formal Specification and Validation of a Static FIFO Queue Model Using Colored Petri Nets." 1994 IEEE Int'l Symposium on Industrial Elect. May 25-27, 1994. pp. 231-235.*

Caramihai, S. et al. "Hybrid Agent Based Control Architecture Supported by T-temporal Petri Nets." Proc. of the 2001 IEEE Int'l Symposium on Intelligent Control. Sep. 5-7, 2001. pp. 205-210.*

(Continued)

*Primary Examiner*—Paul Rodriguez
*Assistant Examiner*—Ayal Sharon
(74) *Attorney, Agent, or Firm*—Dennison, Schultz & MacDonald

(57) ABSTRACT

The invention relates to a process for developing an agent-based, preferably a multi-agent-based, control system (SS) for an industrial flexible production system (PS). To simplify implementation of a control system for a flexible production system, it is provided that a simulation model (KM) of the production system (PS) is generated, and that the simulation model (KM) derived from the production system (PS) is transformed directly into models of a multi-agent-based control system (MASS).

6 Claims, 1 Drawing Sheet

OTHER PUBLICATIONS

Ng, A.H.C. et al. "HSCS—the Design of a Holonic Shopfloor Control System." 1996 IEEE Conf. on Emerging Technologies and Factory Automation. Nov. 18-21, 1996. vol. 1, pp. 179-185.*

Park, Hong-Seok. "A Decision Support System for Short-Term Shop Control Within Holonic Manufacturing Environment." Proc. of the 3rd Russian-Korean Int'l Symposium on Science & Technology (KORUS '99). Jun. 22-25, 1999. vol. 1, pp. 285-288.*

McFarlane, D. et al. "Development of Algorithms for Based Control of Manufacturing Flow Shops." 2001 IEEE Int'l Conf. on Systems, Man and Cybernetics. Oct. 7-10, 2001. vol. 1, pp. 146-151.*

Martinez, M. et al. "Dynamic Assembly Sequences—A Multi-Agent Control System." 1995 INRIA/IEEE Symposium on Emerging Technologies and Factory Automation (EFTA '95). Oct. 1995. vol. 2, pp. 250-258.*

Hsieh, Fu-Shiung. "Modeling and Control of Holonic Manufacturing Systems Based on Extended Contract Net Protocol." Proc. of the American Control Conference. May 8-10, 2002. pp. 5037-5042.*

Hsieh, Fu-Shiung. "Model and Control Holonic Manufacturing Systems Based on Fusion of Contract Nets and Petri Nets." Automatica. Jan. 2004. vol. 40, Issue 1, pp. 51-57. A shorter version of the paper was presented at the 15th IFAC World Congress, Jun. 21-26, 2002.*

Valckenaers, P. et al. "Results of the Holonic Control System Benchmark at KU Leuven." Proc. of the 4th Int'l Conf. on Computer Integrated Manuf. and Automation Technology. Oct. 1994. pp. 128-133.*

Valckenaers, P. et al. "Holonic Manufacturing Control at K.U. Leuven." Proc. 9th IFAC Symp. on Information Control in Manufacturing (INCOM '98). Jun. 24-26, 1998. Abstract Only.*

Colombo, 1$^{st}$ Online Symposium of Electronics Engineers, 2001 "Integration of High-Level Petri Net-Based Formal Methods for Supervision . . . ".

Feldmann et al, IEEE Transactions on Control Systems Technology, Nov. 1999, 7:657-665 "Specification, Design, and Implementation of Logic Controllers . . . Part I".

Feldmann et al, IEEE Transactions on Control Systems Technology, Nov. 1999, 7:666-674 "Specification, Design, and Implementation of Logic Controllers . . . Part II".

Colombo et al, Computer Assisted Management and Control of Manufacturing Systems, Tzafestas (Ed.), pp. 297-324, "Petri Nets for Designing Manuf. Systems".

Sussmann et al, Simulation in Industry 2001, pp. 929-933, "Configuration of Agent-Oriented Manufacturing Systems Using a Petri . . . ".

Zha et al, Robotics and Computer Integrated Manufacturing, 17 (2001) 379-398 "Knowledge Intensive Petri Net Framework for Concurrent Intelligent . . . ".

Weck et al, ZWF Jahrg.96 (2001) 155-159, "Agenten lenken das Unternehmen".

Tonshoff et al, ZWF Jahrg. 95 (2000) 601-604, "Architektur eines Agentenbasierten Systems".

Weck et al, ZWF Jahrg. 94 (1999) 589-592, "Modellierung und Koordination Verteilter Produktionssysteme".

* cited by examiner

PROCESS FOR DEVELOPING AN AGENT-BASED CONTROL SYSTEM FOR AN INDUSTRIAL FLEXIBLE PRODUCTION SYSTEM

The invention is related to a process for developing an agent-based, preferably a multi-agent-based, control system for an industrial flexible production system.

Recent production technologies demonstrate a worldwide trend both toward smaller or average batch sizes and toward product families of greater diversity. This trend frequently is at odds with the demand for greater productivity in terms of a decrease in production time and a simultaneous increase in the utilization of machines.

Industrial flexible production systems that are capable of manufacturing a broad palette of different product families or different product types efficiently and with minimal changes to their production environment are known in the art. But flexibility concepts of this type require complex design methods and control systems, since the degree of flexibility in the production systems is dependent not only upon the flexibility of the individual components of the production system, but also, and to a much greater extent, upon the control system upon which the production system is based.

Between a production system and its control system there exist interactions and complicated connections with respect to their structure and performance.

Currently, a deficiency exists in terms of the methods and processes that are related to a reduction in cost and a detailed design process for an industrial flexible production system. For example, in the article by A. W. Colombo, "Integration of High-Level Petri Net-based Formal Methods for the Supervision of Flexible Production Systems", Tutorial Lecture at the $1^{st}$ Online Symposium of Electronics Engineers, 2001, reference is made to tools and methods for the design, testing, and implementation of a flexible production system, wherein it should be noted, however, that these tools and methods are different from those required for the design, testing, and implementation of the associated control system.

The articles by K. Feldmann, A. W. Colombo, et al. "Specification Design and Implementation of Logic Controllers Based on Colored Petri Net Models and the Standard IEC 1131 Part II: Specification and Design" (IEEE, November 1999, VOL 7, pp 657-665) and K. Feldmann, A. W. Colombo, et al. "Specification, Design, and Implementation of Logic Controllers Based on Colored Petri Net Models and the Standard IEC 1131 part II: Design and Implementation" (IEEE November 1999, VOL. 7, pp 666-674) address the description and the design, as well as the implementation of control systems based upon colored Petri nets. Another article by A. W. Colombo and R. Carelli, "Petri Nets for Determining Manufacturing Systems" from Sypros G. Tzafestas "Computer-Assisted Management and Control of Manufacturing Systems", Springer Publishers, the content of which is incorporated into this application, concerns the use of Petri nets to simulate production systems. A reference to multi-agent-based control systems is not addressed in the articles.

Without suitable control software an intelligent production system is useless. The control software organizes production, plans, and synchronizes the allocation of resources. In addition, the reliability and degree of flexibility of the production system is determined not only by the reliability and flexibility of the mechatronic components, such as the work station and the storage, handling, and transport systems, etc., but also to a considerable extent by the reliability and flexibility of the control system. Due to the immense interaction among the various components of the production system and the multitude of the functions performed, a control system for an intelligent production system according to the current state of the art is designed and realized in a diverse manner.

In particular, the implementation of an agent-based control system according to the state of the art is carried out manually. In this, the correctness or accuracy of the design can be confirmed only when the implementation of the flexible production system has been completed. Because the control software must be generated separately from the design and implementation of the production system to be controlled, the entire process requires a great deal of time, leads easily to ambiguities and errors, and as a result is most frequently highly cost-intensive.

Based upon the set of problems described above, the object of the invention is to further develop a process of the type named at the beginning such that the implementation of an agent-based control system for a flexible production system is simplified.

The object is attained with the characterizing features of claim 1, among others.

The process specified in the invention is based upon the idea of supporting the entire development process of a industrial flexible production system and its multi-agent-based control system, from requirements analysis through modeling to validation, using a discrete, event-oriented simulation process, preferably based upon high-level Petri nets and/or expanded colored Petri nets. Processes of this type are capable of connecting models to reality, i.e. for example processing sensor signals that will be used in the simulation.

According to the invention, an integration of the modeling and the validation of the flexible production system and its multi-agent-based control system within a single design phase are accomplished.

High-level Petri nets as formal methods for constructing models of an industrial flexible production system are characterized in particular in that the models generated via these methods can be transformed directly into models for a multi-agent-based control logic, and then implemented. In addition, it is guaranteed that the requirement for applicability and flexibility of the entire system will be satisfied.

Starting with a preset hardware and software configuration for an industrial flexible production system, and based upon information regarding the tasks and functions that must be realized in the system, the following preferred process steps are accomplished:

Generation of a simulation model, preferably based upon high-level Petri nets for each component of the flexible production system, taking into account sequence-based specifications, Generation of a simulation model of interfaces such as sensor-actuator interfaces for each component within a logic control structure derived from the simulation model, taking into account mechatronic specifications, Validation of the specifications for each modeled component and the associated control structure, Generation of a coordination model of the components or the agents based upon the specifications of a layout of the flexible production system, preferably taking into account both competitive and cooperative behavior among the components, wherein the coordination model serves as the basis for the multi-agent-based control structure of the flexible production system.

From the validation of structural and dynamic specifications of the multi-agent-based control structure or the layout of the flexible production system, and the performance of the flexible production system, information is generated, especially regarding sequence strategies, conflicts, autonomous and/or cooperative decision-making processes, coordination, competition, product specification and/or control commands, etc. that can occur in the system. This is followed by the generation, testing, and optimization of specifications, such as maintenance specifications, for the multi-agent-based control structure, and the associated sequence control strategy for the flexible production system that is to be controlled.

With respect to the process step in which a coordination model of the components and/or the agents is created based upon the specifications of the layout of the flexible production system, it should be noted that in this an agentification of a flexible production system is derived entirely from the high-level Petri net—simulation model. The coordination model serves as the basis for the multi-agent-based control structure of the flexible production system.

Each simulation model contains structural and dynamic properties for the modeled production components. If the coordination model is generated from the individual models, both physical and logical interactions between the production components are considered. From the point of view of the production system, the coordination model is a reflection of the hardware (production system). From the point of view of the control system, the coordination model is a reflection of the control system (topology÷intelligence).

The physical interactions are characterized in the implementation phase of the multi-agent-based control system with the future exchange of mechatronic signals between the control system and the production system.

The logic interactions are related primarily to production specifications or production strategies, which must control and supervise the multi-agent-based control system. The quality of the control and supervising activities is characterized by how much intelligence the control system has (intelligence in the sense of optimal and/or pseudo-optimal decisions regarding the resolution of conflicts). The high-level Petri net-based simulation models represent a framework for the multi-agent-based control system, and they are capable of identifying the conflicts, allocating the necessary production and control information for the decision-making process, and especially validating or optimizing the outcome of the resolution of conflicts. From this, it follows that the simulation model not only represents the multi-agent-based control structure, but also permits the design or the optimization of the performance of this multi-agent-based structure, which is to be emphasized as a particular advantage of the process specified in the invention.

In contrast to the current state of the art solution, the process specified in the invention is able to derive considerable potential for savings in terms of time and cost via the use of uniform, platform-independent, configurable high-level Petri net simulation models of industrial flexible production systems and their multi-agent-based control structures that can be used in actual operations.

Further details, advantages, and characterizing features of the invention are disclosed not only in the claims, the characterizing features—alone and/or in combination—but also from the exemplary design in the following description.

DETAILED DESCRIPTION OF THE DRAWING

Figure 1:
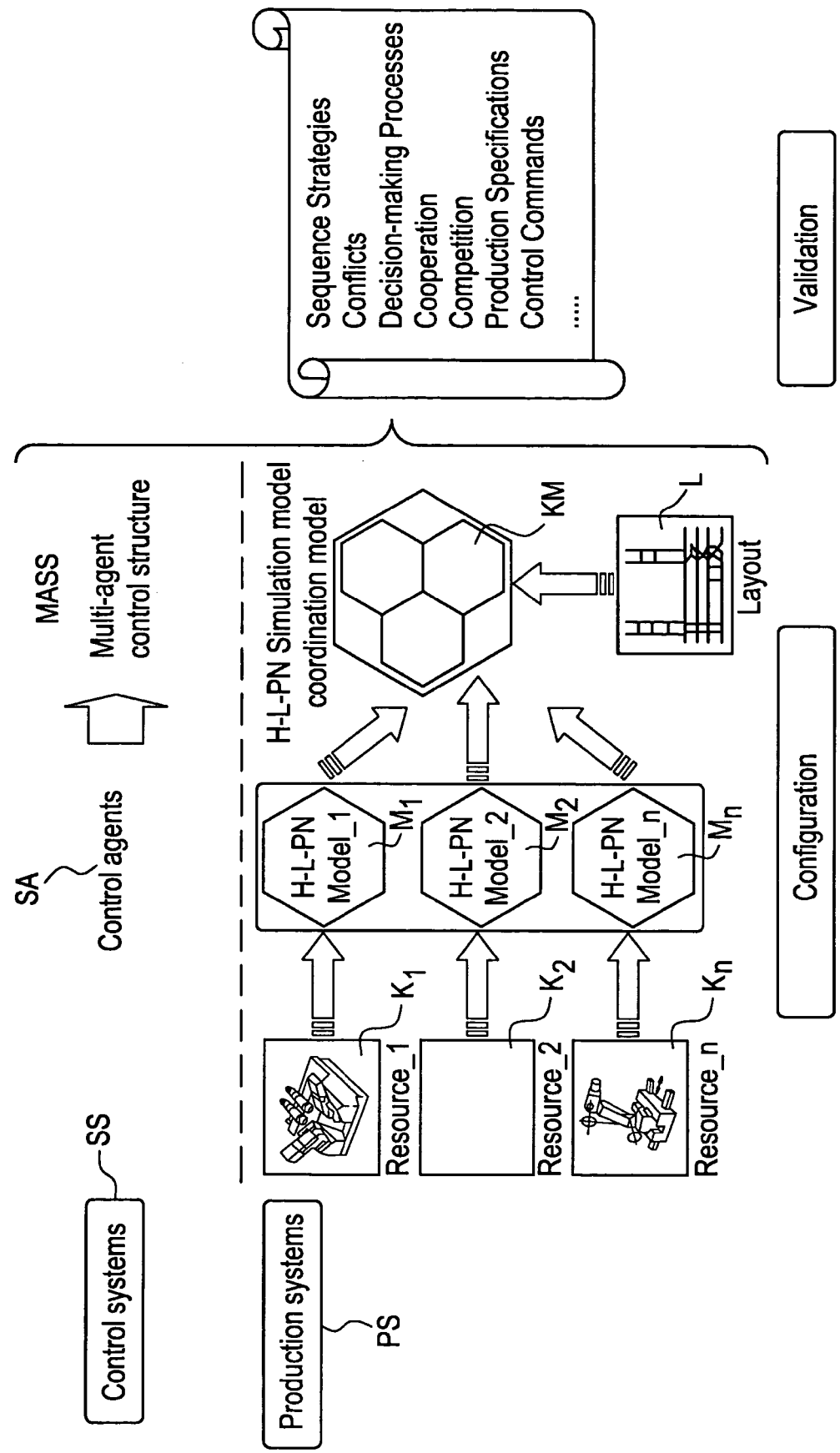
FIG. 1 shows a schematic representation of the process.

The single drawing shows a schematic representation of the process. First, for each component K1 . . . KN of a flexible production system PS based upon high-level Petri nets, simulation models M1 . . . MN are created, which are integrated to form a high-level Petri net coordination model KM, which ultimately represents a layout L, i.e. the mechanical structure of the flexible production system. In other words, a high-level Petri net model is derived from the necessary decisions of the production control, in order to provide the developing engineer with the possibility of going straight from the production sphere to the agent-based development sphere.

Finally, control agents SA of the control system SS are derived from the high-level Petri net-based model of the components of the production system, i.e. a mapping takes place from the production process and the production specifications to an agent-oriented concept via identification of the agents and their capabilities.

A multi-agent-based control platform for the production system is then configured, using information from the high-level Petri net-based coordination model KM of the production system. This is followed by the identification of agent-based decisions, and the design of interactions among agents for control (dynamic planning) of the production environment.

According to the invention, a qualitative analysis and validation of structural and performance specifications, such as sequence strategies, conflict situations, decision-making processes, cooperation, competition, product specifications, control commands, etc., of the agent-oriented production system can be carried out using formal methods of analysis in conjunction with the mathematical principles of the high-level Petri net-based simulation models. This is followed by a mapping of transition and local flows of the high-level Petri net-based model on the set of dispersed control and product specifications. Finally, a validation of structural and dynamic specifications of the multi-agent-based control structure or of the layout and performance of the flexible production system is carried out using analytical methods in conjunction with the mathematical principles of the high-level Petri net-based simulation model. In addition, a validation of the performance specifications of the production environment takes place, if this is set forth and supervised by the agent-based control system.

The process specified in the invention generates a set of qualitative and quantitative criteria that are based upon the agents, in order to improve their "social behavior", i.e. their behavior among one another and their future interactions within the production environment.

Due to their expandability and modular construction, the developed high-level Petri net simulation models present a multitude of advantages:

- Specifications of production and agent-based control systems can be generated and validated together,
- Projection and validation of flexible production systems and multi-agent-based control systems are viewed together and run simultaneously, whereby the interactions between the two components are considered,
- Correctness or accuracy of the design of the control system can be confirmed before the implementation of the flexible production system is completed, and The formal mapping of the flexible production system and its integrated multi-agent-based control system can be viewed as a single unit, which can be applied by both the production engineer and the developer, in order to generate e.g. test cases in both spheres (production and control).

The term high-level Petri net used here is to be identified with expanded colored Petri nets (colored Petri net) from informatics and system theory. This means that the structure of the net is completed with supplemental data and functions, and that the dynamic behavior of the net can be formalized on the basis of functional analysis. The components of a model are viewed as objects which simulate actual components of a system (both static and dynamic): here production or control components and agents.

The invention claimed is:

1. A computer implemented process for developing a multi-agent based control system (SS) for an industrial flexible production system (PS) comprising several hardware/software (mechatronics) components (K1-KN) based on a given hardware/software configuration from the industrial flexible production system, and based upon information regarding the tasks and functions that must be realized in the system, comprising the steps of:

generation of a high-level-Petri net simulation model (M1-MN) for each component (K1-KN) of the flexible production system (PS) whereby each simulation model (M1-MN) is composed of all elements of a High-Level Petri net whereby each model is generated based on dynamic hardware/software (mechatronics) specifications in a discrete, event-organized process, and the simulation model (M1-generating, testing, and optimizing of specifications for the multi-agent-based control system (SS) and the associated sequence control strategy for the flexible production system (PS).

2. The computer implemented process of claim 1, wherein the simulation models (M1 . . . MN) for each component (K1 . . . KN) of the flexible production system (PS) are generated based on sequence-based specifications.

3. The computer implemented process of claim 1 or 2, wherein the simulation models (M1 . . . MN) of interfaces such as sensor-actuator interfaces for each component (K1 . . . KN) are generated within a logical control structure that is derived from the simulation model (M1 . . . MN), based on mechatronic specifications of the modeled productions components.

4. The computer implemented process of claim 1, wherein the coordination model (KM) of the components (K1 . . . KN) and/or of the agents (SA) based upon the specification of the layout (L) of the flexible production system is generated based on both a competition and a cooperation relationship among the components.

5. The computer implemented process of claim 1, wherein the high-level Petri net MN) represents a basis for agent associated with the hardware/software (mechatronics) component, generation of a high-level-Petri net simulation model (M1-MN) of interfaces for each component within a logic control structure derived from the simulation model of the hardware and software components, based on the hardware/software (mechatronic,) specifications, formal analysis of the High-level Petri net simulation model (M1-MN) of each component and validation of the specifications for each modelled hardware/software (mechatronic) component (K1-KN) and the associated control structure, integration of modelling and validation of the flexible production system (PS) and its multi-agent based control system (SS) in one single design phase, by generation of a high-level-Petri net coordination model (KM) for the simulation models (M1-MN) of the components based upon the specifications of a layout (L) of the flexible production system, based on both competitive and cooperative behaviour among the components, wherein the coordination model (KM) serves as the basis for the multiagent-based control system (SS) of the flexible production system (PS), transforming the coordination model (KM) directly into models of the multi-agent based control system (SS), implementing the models of the multi-agent based control system (SS), formal analysis and validation of structural and dynamic hardware/software specifications of the multi-agent based control system (SS) and of the production system (PS) and, simulation model (KM) is used as the basis of the multi-agent based control structure (MASS) of the flexible production system (PS).

6. The computer implemented process of claim 1, wherein the simulation-based and/or formal validation of structural and dynamic specifications of the multi-agent based control structure and/or of the layout of the flexible production system and of the behavior of the flexible production system encompass in particular: sequence strategies, conflicts, autonomous and/or cooperative decision-making processes, coordination, competition, product specification, and/or control commands that can occur in the system.

* * * * *